(12) United States Patent
Kalscheur (10) Patent No.: US 10,788,316 B1
(45) Date of Patent: Sep. 29, 2020

(54) MULTI-SENSOR REAL-TIME ALIGNMENT AND CALIBRATION

(71) Applicant: Apple Inc., Cupertino, CA (US)

(72) Inventor: Micah P. Kalscheur, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 425 days.

(21) Appl. No.: 15/709,391

(22) Filed: Sep. 19, 2017

Related U.S. Application Data

(60) Provisional application No. 62/397,462, filed on Sep. 21, 2016.

(51) Int. Cl.

| | |
|---|---|
| *G01B 11/25* | (2006.01) |
| *G01B 11/27* | (2006.01) |
| *G06T 7/521* | (2017.01) |
| *G01C 25/00* | (2006.01) |
| *G01B 11/02* | (2006.01) |

(52) U.S. Cl.
CPC ............ *G01B 11/25* (2013.01); *G01B 11/026* (2013.01); *G01B 11/27* (2013.01); *G06T 7/521* (2017.01); *G01C 25/00* (2013.01)

(58) Field of Classification Search
CPC ....... G01B 11/25; G01B 11/026; G01B 11/27; G06T 7/521; G01C 25/00
See application file for complete search history.

(56) References Cited

U.S. PATENT DOCUMENTS

| | | | |
|---|---|---|---|
| 7,337,650 | B1 | 3/2008 | Preston et al. |
| 8,135,513 | B2 | 3/2012 | Bauer et al. |
| 8,212,874 | B2 | 7/2012 | Zeng et al. |
| 10,417,520 | B2 | 9/2019 | Gauthier |
| 2010/0235129 | A1 | 9/2010 | Sharma et al. |
| 2015/0367855 | A1* | 12/2015 | Parchami .............. G06T 7/0004 701/36 |
| 2016/0161602 | A1* | 6/2016 | Prokhorov ............ G01S 7/4972 702/97 |
| 2017/0343654 | A1* | 11/2017 | Valois ..................... G01S 7/497 |

* cited by examiner

*Primary Examiner* — Manuel L Barbee
(74) *Attorney, Agent, or Firm* — Robert C. Kowert; Kowert, Hood, Munyon, Rankin & Goetzel, P.C.

(57) ABSTRACT

Methods and systems for multi-sensor real-time alignment and calibration are disclosed herein. A vehicle includes a projector configured to project a pattern on a target location. The vehicle also includes one or more sensors. The one or more sensors are configured to capture sensor data from the target location and detect the pattern at the target location. The vehicle further includes a calibration system configured to determine whether a particular sensor of the one or more sensors is out of alignment based on a relative position of the pattern as detected by the one or more sensors. The calibration system is also configured to, based on a determination that the particular sensor is out of alignment, adjust an alignment of the particular sensor based on the sensor data and the diffractive pattern.

20 Claims, 7 Drawing Sheets

MULTI-SENSOR REAL-TIME ALIGNMENT AND CALIBRATION

This application claims benefit of priority to U.S. Provisional Application No. 62/397,462, filed Sep. 21, 2016, titled "Multi-Sensor Real-Time Alignment and Calibration," which is hereby incorporated by reference in its entirety.

BACKGROUND

An autonomous vehicle includes numerous optical sensors configured to sense a surrounding environment around the vehicle. The optical sensors provide information regarding the environment to the vehicle such that the vehicle is spatially aware of the vehicle's surroundings in order to determine an appropriate action. Over time, the vehicle may encounter various impacts that may disrupt positioning of the sensors, such as bumps in a road, vibrations from driving or sudden stoppage while driving. These impacts can potentially cause the sensors to be out of alignment from original factory specifications. Unaligned or misaligned sensors can disrupt autonomy functions of the vehicle due to incorrect or misinterpreted data from the sensors.

The sensors may require realignment to ensure proper detection of the surrounding environment for safety of all passengers in the vehicle. The sensors can be readjusted to ensure that the surrounding environment is oriented how the sensors believe they are oriented. Taking the vehicle into a service center for realignment of the sensors is inefficient and inconvenient for an owner of the vehicle. Relative calibration may improve the functionality of the sensors to detect the surrounding environment.

SUMMARY

Multi-sensor real-time alignment systems and methods are described herein. An autonomous vehicle may include numerous sensors to survey a surrounding environment. The sensors may include cameras, such as stereo cameras, or light dynamic and ranging (lidar) sensors. The sensors may be installed in the vehicle at an initial configuration or alignment. Over time, motion of the sensors may cause the sensors to become misaligned.

A vehicle is disclosed herein including a projector configured to project a pattern on a target location. The system also includes one or more sensors coupled to a vehicle. The one or more sensors may be configured to capture sensor data from the target location. The one or more sensors may also be configured to detect the pattern at the target location. The vehicle further includes a calibration system. The calibration system is configured to determine whether a particular sensor of the one or more sensors is out of alignment based on a relative position of the pattern as detected by the one or more sensors. The calibration system is also configured to, based on a determination that the particular sensor is out of alignment, adjust an alignment of the particular sensor based on the sensor data and the diffractive pattern.

A method is disclosed herein, the method including receiving, from one or more sensors of a vehicle, sensor data indicative of a target location. The method also includes determining a relative position of a pattern at the target location indicated in the sensor data. The method also includes determining whether the one or more sensors are out of alignment based on the relative position of the pattern. The method further includes modifying an alignment of the one or more sensors based on the relative position of the pattern.

A non-transitory computer-readable storage medium is disclosed herein. The non-transitory computer-readable storage medium stores instructions that, when executed by one or more processors, cause the one or more processors to perform operations. The operations include receiving, from one or more sensors of a vehicle, alignment data identifying an alignment of the one or more sensors. The operations also include determining, based on the alignment data, whether the one or more sensors are misaligned. The operations further include instructing, in response to a determination that the one or more sensors are misaligned, instructing a calibration system to adjust alignment of the one or more sensors based on a reference point that is outside of the vehicle.

DETAILED DESCRIPTION

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

Figure 1:
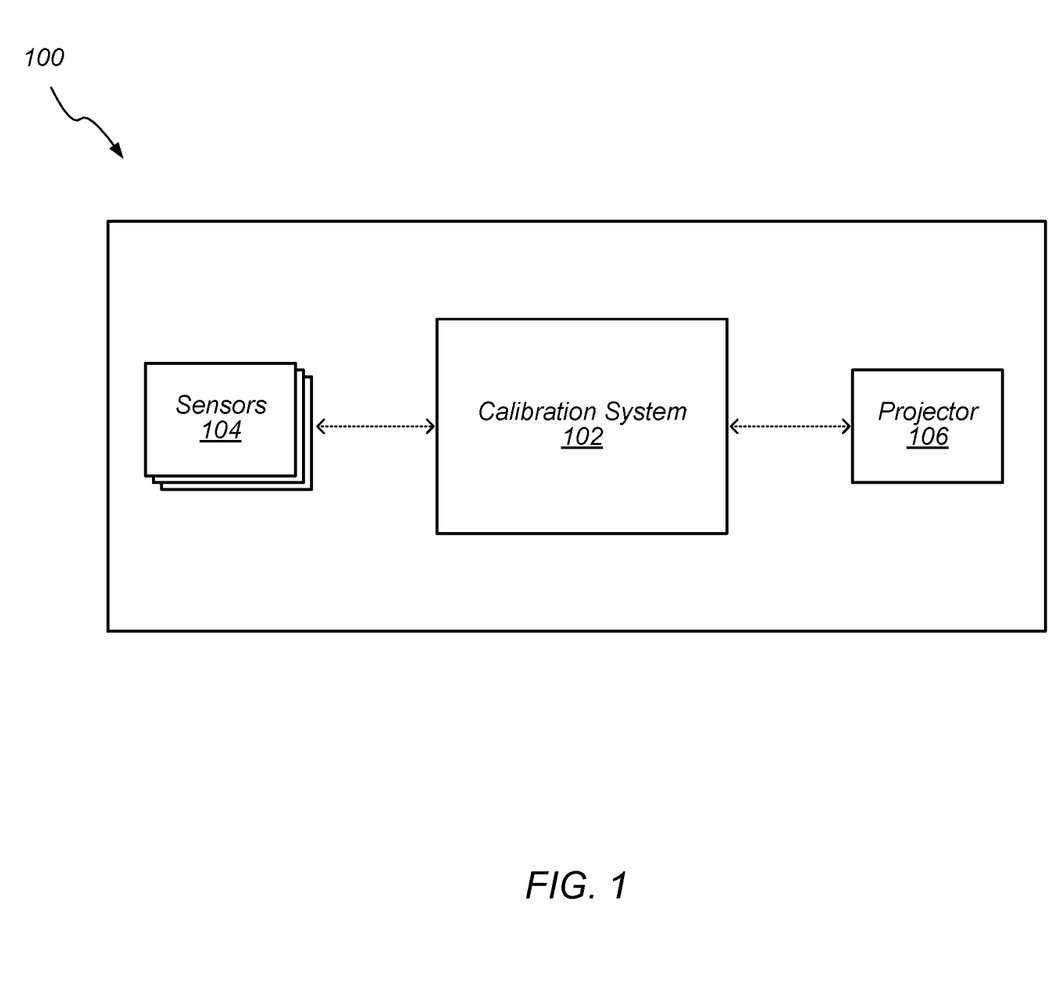
FIG. 1 illustrates a block diagram of a vehicle configured to calibrate one or more sensors based on a diffractive pattern projected at a target location, according to some embodiments.

FIG. 1 illustrates a block diagram of a vehicle 100. The vehicle 100 may include a calibration system 102 configured to calibrate one or more sensors 104 by using a projector 106 to project a pattern at a target location.

The calibration system 102 may be configured to instruct the one or more sensors 104 to perform a calibration or an alignment. In some embodiments, the one or more sensors 104 may include one or more actuators configured to align or calibrate the one or more sensors 104. For example, the one or more actuators may be integrated with the one or more sensors 104. In other embodiments, the calibration system 102 may include one or more external mechanisms configured to realign or calibrate the one or more sensors 104. For example, the one or more external mechanisms may be one or more external actuators separate from the one or more sensors 104. In another example, the one or more external mechanisms may be configured to physically move the one or more sensors 104 based on an instruction from the calibration system 102. In some embodiments, the calibration system 102 may determine that the one or more sensors 104 are out of alignment based on the one or more sensors 104 sending data indicating a current relative position. For example, the one or more sensors 104 may include one or more hardware components configured to detect their relative positions such that a particular hardware component is aware of its positioning within the one or more sensors 104. In other embodiments, the calibration system 102 may instruct the one or more sensors 104 to perform the calibration at various time intervals or at particular events, such as starting the vehicle 100.

The projector 106 may include a diffractive optical element and a light source. The projector 106 may be configured to project a pattern to a target location, as described herein. The pattern may be projected by the projector 106 while the vehicle 100 is stationary. Alternatively, the pattern may be projected by the projector 106 while the vehicle 100 is in motion. While the vehicle is in motion, various non-uniform portions of the target location (e.g., a road) may be averaged over a period of time. For example, the road may include rocks or dips that disrupt the pattern such that tracking the pattern over the period of time may allow the one or more sensors 104 to sense an averaged view of the pattern that excludes momentary or instantaneous disruptions that cause the pattern to appear distorted or imperfect.

In some embodiments, the vehicle 100 may be an autonomous vehicle, such as a vehicle configured to navigate and drive with little to no input from the driver of the vehicle. The one or more sensors 104 may provide sensor data to the vehicle 100 to allow the vehicle 100 to determine a navigation command. For example, the navigation command may cause the vehicle 100 to accelerate, decelerate, turn, maintain current trajectory, or any combination thereof. Autonomous functions of the vehicle 100 may become compromised if the one or more sensors 104 provide inaccurate sensor data, such as by being misaligned. For example, the one or more sensors 104 may provide inaccurate sensor data when the one or more sensors 104 report that a road hazard is several feet from its actual location. As a safety feature, the vehicle 100 may disable autonomous functions until the one or more sensors 104 are aligned.

The calibration system 102 may determine that the one or more sensors 104 are misaligned. In some embodiments, the one or more sensors 104 may be configured to diagnose their respective alignments. After diagnosing a misaligned sensor, the calibration system 102 may initiate a calibration process utilizing the projector 106, as described herein. In other embodiments, the one or more sensors 104 may be configured to automatically initiate the calibration process when starting the vehicle 100. After the starting the vehicle 100, autonomous functionality may be disabled until the calibration process is completed. For example, the vehicle 100 may be limited to manual control until the calibration system 102 indicates that the one or more sensors 104 are aligned within an alignment threshold. After the calibration system 102 indicates that the one or more sensors 104 are aligned, the vehicle 100 may restore or continue autonomous functions such that the vehicle 100 may drive autonomously.

Figure 2A:
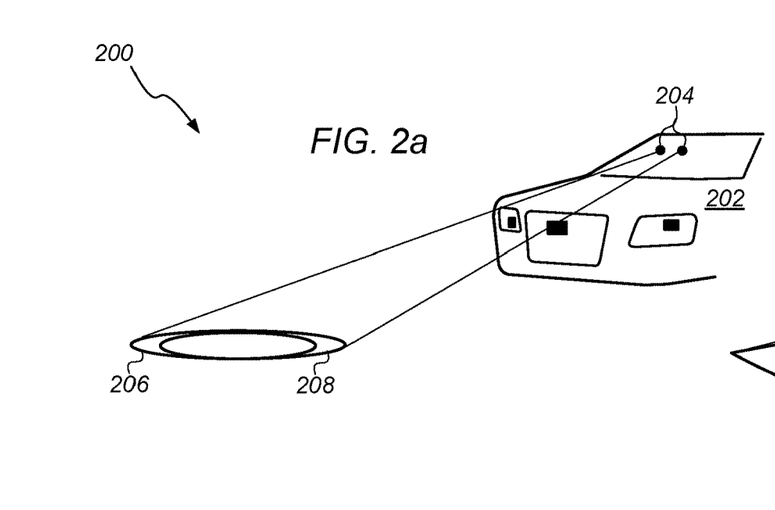
FIGS. 2a-c illustrate a vehicle having different types of sensors configured to sense an environment around the vehicle, according to some embodiments.
Figure 2B:
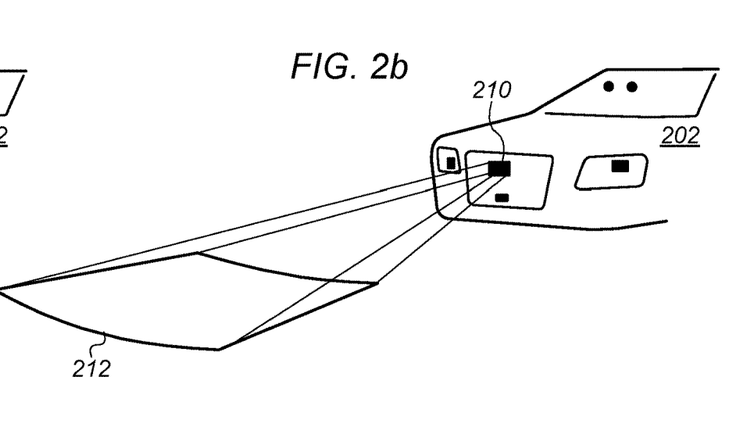
Figure 2C:
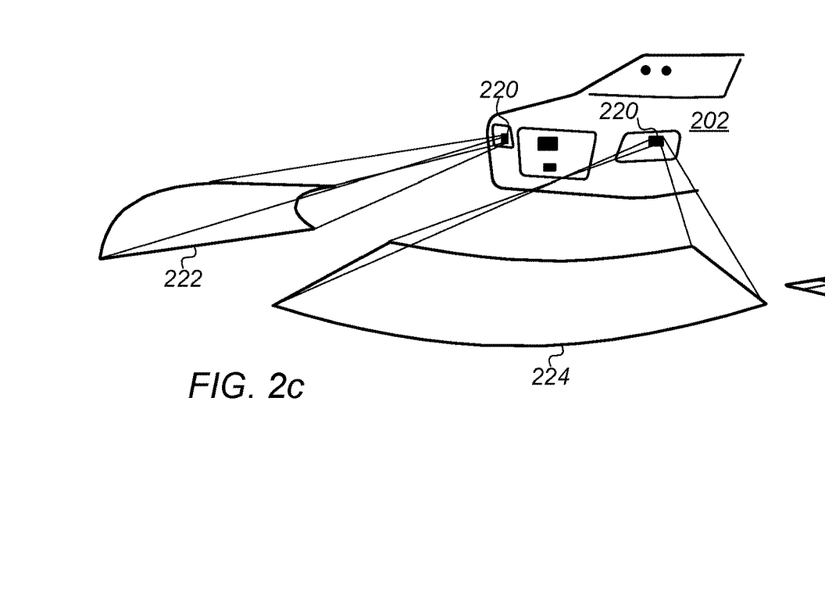

FIGS. 2a-c illustrate sensor calibration system 200 including a vehicle 202 having one or more sensors configured to capture sensor data for a target location. The vehicle 202 may correspond to the vehicle 100 of FIG. 1. The one or more sensors may correspond to the one or more sensors 104 of FIG. 1.

FIG. 2a illustrates the vehicle 202 including one or more cameras 204. In some embodiments, multiple cameras 204 may be used to have depth sensing functionality. In other embodiments, one camera 204 may be used to have a simple view of the surrounding environment. The one or more cameras may be mounted in an elevated position of the vehicle 202. For example, the cameras may be mounted behind a windshield at an upper portion, such as near a rear view mirror, in order to have a better view of the surrounding environment.

The multiple cameras 204 may be configured to capture sensor data corresponding to multiple fields of view 206 and 208. In some embodiments, the fields of view 206 and 208 may be configured to overlap. Using the fields of view 206 and 208, the multiple cameras 204 may generate sensor data with depth information associated with the target location. For example, the multiple cameras 204 may be configured to compare the field of view 518 with the field of view 519 to determine distances to objects that may be present at the target location.

FIG. 2b illustrates the vehicle 202 including a front light detection and ranging (lidar) sensor 210. In some embodiments, the front lidar sensor may be positioned at a front portion of the vehicle 202. For example, the front lidar sensor may be coupled to a front grill of the vehicle 202. The front lidar sensor may be configured to have a field of view 212 that is generally directed to a front target location. The front lidar sensor may be configured to capture light data corresponding to the front target location as the sensor data.

FIG. 2c illustrates the vehicle 202 including a plurality of side lidar sensors 220. The plurality of side lidar sensors 220 may be configured to capture a peripheral view of the target location. The peripheral view may be to a side of the target location to increase a number of views of the target location. The plurality of side lidar sensors 220 may have fields of view 222 and 224. The plurality of side lidar sensors 220 may be configured such that the field of view 222 does not overlap with the field of view 224.

Figure 2D:
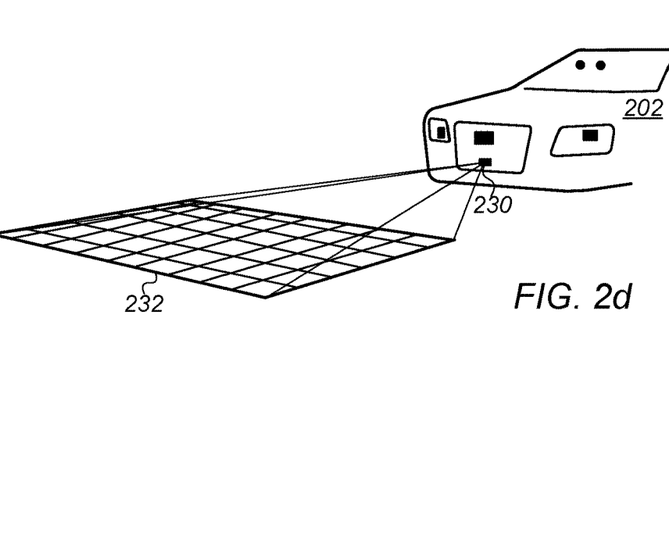
FIG. 2d illustrates a vehicle configured to project a diffractive pattern at a target location, according to some embodiments.

FIG. 2d illustrates the vehicle 202 including a projector 230. The projector 230 may be configured to project a pattern 232 at the target location. The one or more cameras 204 of FIG. 2a, the front lidar sensor 210 of FIG. 2b and the plurality of side lidar sensors 220 of FIG. 2c may be configured to detect the pattern 232. The one or more cameras 204 of FIG. 2a, the front lidar sensor 210 of FIG. 2b and the plurality of side lidar sensors 220 of FIG. 2c may also be configured to calibrate based on an expected position of the pattern 232 relative to an actual position of the pattern 232 relative to the vehicle 202.

Figure 3:
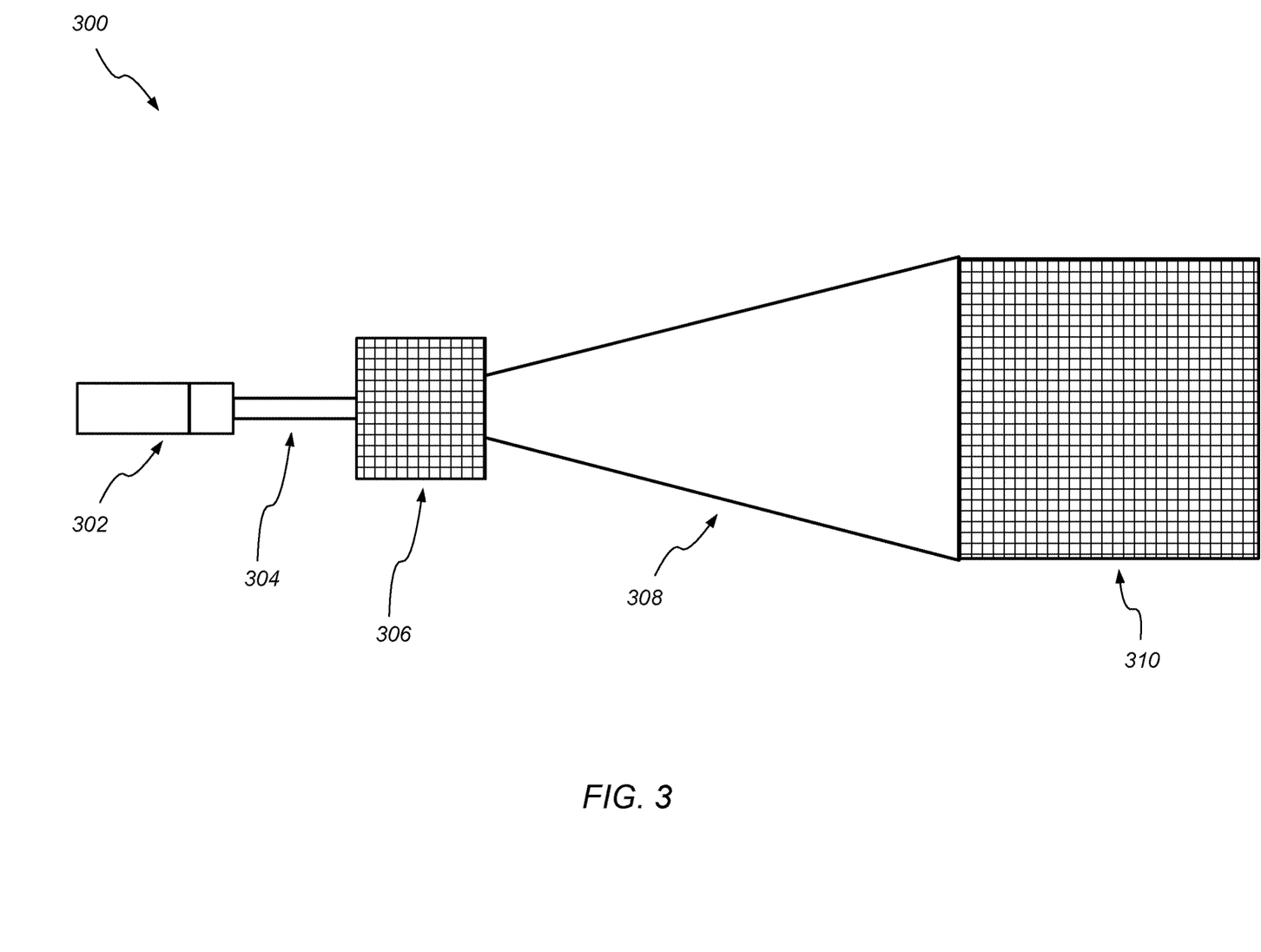
FIG. 3 illustrates a projector including a light source configured to project a light signal through a diffractive optical element, according to some embodiments.

FIG. 3 illustrates a projector 300 including a light source 302 and a diffractive optical element 306. The projector 300 may correspond to the projector 106 of FIG. 1 or the projector 230 of FIG. 2.

The projector 300 may be configured to project a pattern 310 at a target location. In some embodiments, the pattern 310 may include a shaped pattern, such as a geometric shape. In other embodiments, the pattern 310 may include a diffractive pattern. For example, the light source 302 may be configured to emit a light 304 toward the diffractive optical element 306. The diffractive optical element 306 may be configured to create a pattern 310 with the light 304 originating from the light source 302. For example, the light 304 may be diverted or redirected by the diffractive optical element 306 such that the pattern 310 is projected in an outward direction from the projector 300. In some embodiments, the light source 302 may be a laser. In other embodiments, the light source 304 may include a plurality of light emitting diodes (LEDs), a halogen light bulb, a xenon light bulb, any combination thereof, or any other light emitting apparatus. In some embodiments, the projector 300 may include a lens that further causes the pattern 310 to expand in size when being projected away from the projector 300.

The light 304 may have a wavelength along the spectrum range of visible light. For example, the light 304 may include a near-infrared light (e.g., a spectral range of 700-1000 nm). In some embodiments, the light 304 may include a more visible light (e.g., a spectral range of 400 nm-700 nm).

The pattern 310 may be formed from a near-infrared light such that one or more sensors may detect the pattern 310 while minimizing visibility to a driver or other passengers of a vehicle. In low light environments, the one or more sensors may be configured to detect the pattern 310 having near-infrared light. For example, the one or more sensors 104 may project near-infrared light to form the pattern 310 in order to minimize visible light that is visible to the driver of the vehicle. In some embodiments, the pattern 310 may be formed from a more visible light such that the one or more sensors may detect the pattern while also providing visibility to the driver or the other passengers of the vehicle.

The diffractive optical element 306 may be configured to diffract or cause interference to the light 304 to generate a diffracted light 308. In some embodiments, the diffractive optical element 306 may be low in mass to prevent movement or drift of the diffractive optical element 306 during operation of the vehicle. In other embodiments, the diffractive optical element 410 may be affixed to the vehicle, such as to a body frame, to prevent movement of the diffractive optical element 306. In some embodiments, the diffractive optical element 306 may be centered on the body frame such that an alignment of the diffractive optical element 306 is fixedly maintained throughout usage of the vehicle. The diffractive optical element 306 may be constructed from a material that is resistant to thermal expansion to prevent unintended movement of the diffractive optical element 306 over time.

The diffractive optical element 306 may be configured to generate a diffractive pattern by having one or more occlusions or obstacles that prevent the light 304 from passing through particular portions of the diffractive optical element 306. The diffracted light 308 may be projected to the target location to show a pattern 310 at the target location. In some embodiments, the pattern 310 may be a grid with defined spacing. In other embodiments, the pattern 310 may have a known random element such that the pattern 310 is detectable by the one or more sensors and decipherable by a calibration system.

Figure 4:
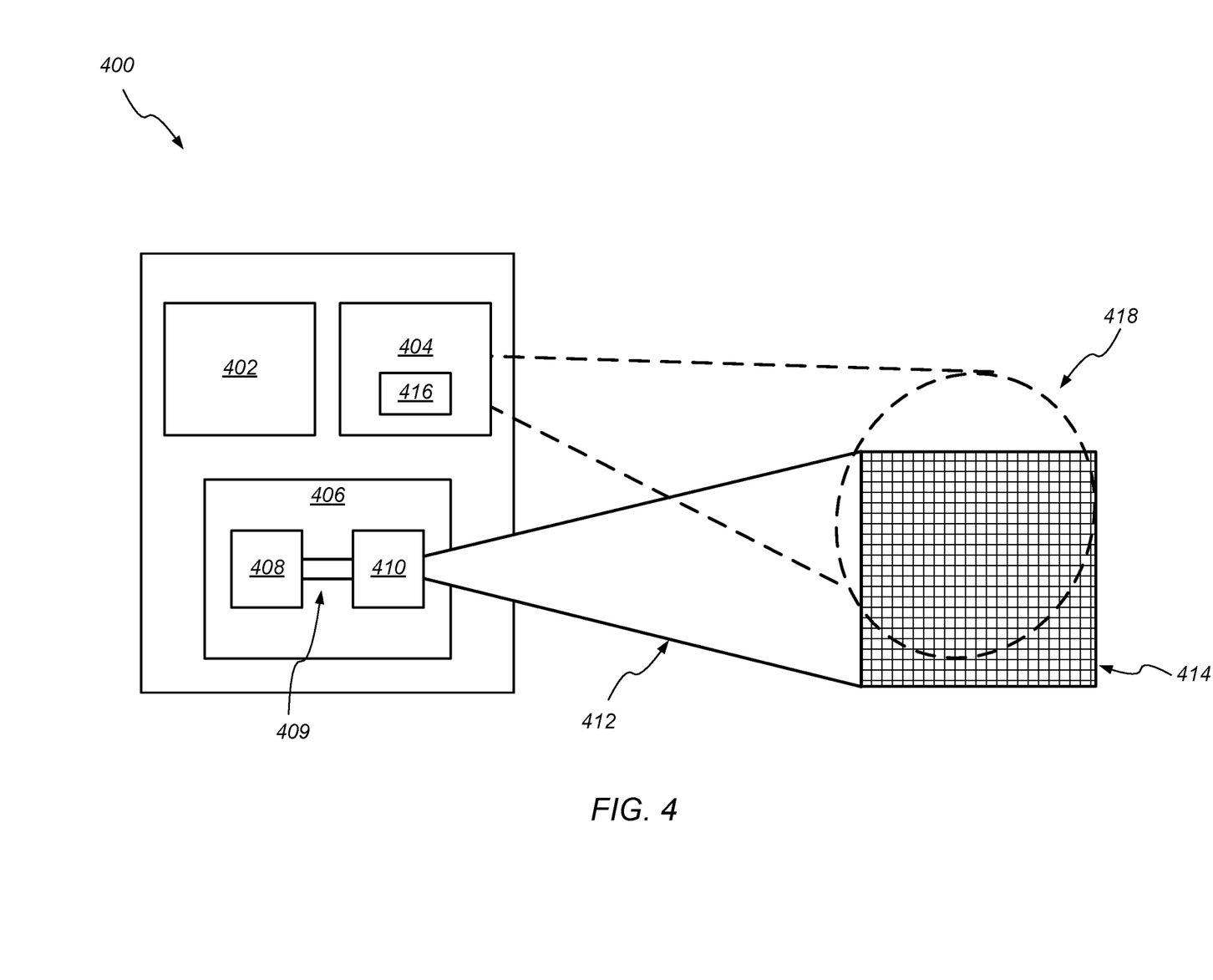
FIG. 4 illustrates a block diagram of a vehicle configured to calibrate one or more sensors based on a diffractive pattern projected at a target location, according to some embodiments.

FIG. 4 illustrates a vehicle 400 including a calibration system 402, one or more sensors 404 and a projector 406, according to some embodiments. The calibration system 402 may be configured to calibrate the one or more sensors 404 based on a diffractive pattern 414 being projected at a target location by the projector 406.

The one or more sensors 404 may be configured to capture sensor data 416 corresponding to the target location. The one or more sensors 404 may have a field of view 418 directed toward the target location. In some embodiments, the one or more sensors 404 may include a light detection and ranging (lidar) sensor. The lidar sensor may be configured to capture light data corresponding to the target location as the sensor data 416. In some embodiments, the lidar sensor may be positioned at a front portion of the vehicle 400. For example, the lidar sensor may be coupled to a front grill of the vehicle 400.

The projector 406 may include a light source 408 and a diffractive optical element 410, as described herein. The light source 408 may be configured to project a light 409 to the diffractive optical element 410. In some embodiments, the light source 408 may be a laser. In other embodiments, the light source 408 may include a plurality of light emitting diodes (LEDs), a halogen light bulb, a xenon light bulb, any combination thereof, or any other light emitting apparatus. The light 409 may have a wavelength in the spectrum range of visible light.

The light source 408 may be configured to project the light 409 at an interval. The light source 408 may limit visibility of the pattern 414 in certain lighting environments by refraining from projecting the light 409 when the one or more sensors 404 might not be capturing the field of view 418. For example, at night, the light source 408 may synchronize a frequency of projecting the light 409 to coincide with a capture frequency rate of the one or more sensors 404. The light source 408 may be configured to pulse the light 409 at the frequency that is equivalent to the capture frequency rate such that the light 409 is illuminated simultaneously to when the one or more sensors 404 capture the camera data for the target location. In other words, the light source 408 may pulse the light 409 to synchronize with a frame rate of the one or more sensors 404.

The diffractive optical element 410 may be configured to diffract or cause interference to the light 409 to generate a diffracted light 412. The diffractive optical element 410 may be configured to generate a diffractive pattern by having one or more occlusions or obstacles that prevent the light 409 from passing through particular portions of the diffractive optical element 410. The diffracted light 412 may be projected to the target location to show a pattern 414 at the target location. In some embodiments, the pattern 414 may be a grid with defined spacing. In other embodiments, the pattern 414 may have a known random element such that the pattern 414 is detectable by the one or more sensors 404 and decipherable by the calibration system 402.

The calibration system 402 may be configured to determine a current alignment of the one or more sensors based on the sensor data 416 and a relative position of the pattern 414. The calibration system 402 may have configuration data indicating an expected configuration of the one or more sensors 404. The expected configuration of the one more sensors 404 may indicate an initial configuration or alignment of the one or more sensors 404 that is set during construction of the vehicle 400. For example, a manufacturer may set the one or more sensors 404 at a particular angle to capture a particular view. The particular angle may be stored as the expected configuration as a basis for future calculations by the vehicle 400 and the calibration system 402.

In some embodiments, the vehicle 400 may be an autonomous vehicle. The vehicle 400 may require that the sensor data 416 be as accurate as possible in order to determine a best possible course of action during autonomous driving of the vehicle 400. The sensor data 416 is considered accurate when the one or more sensors 404 capture data that the vehicle 400 expects it to capture, such as when the one or more sensors 404 are aligned in an expected configuration. The calibration system 402 may be configured to determine an alignment the one or more sensors 404 based on a relative position of the pattern 414 in the field of view 418. In some embodiments, the alignment may be determined by comparing the relative position of the pattern 414 against an expected relative position of the pattern 414. The expected relative position may be indicated by the expected configuration. In some embodiments, the expected configuration may indicate that the expected relative position of the pattern 414 is centered in the field of view 418. In other embodiments, the expected configuration may indicate that the expected relative position of the pattern 414 is off-center in the field of view 418.

Based on the expected configuration and the field of view 418, the calibration system 402 may determine that the one or more sensors 404 need to be recalibrated. The one or more sensors 404 may be configured to adjust the alignment by including one or more mechanical elements that are configured to move one or more components of the one or more sensors 404. For example, the one or more sensors 404 may have an optical lens that may be moved along one or more axes of directional movement. In other embodiments, the one or more sensors 404 may be moved as a whole unit by the one or more mechanical elements.

In some embodiments, the calibration system 402 may instruct the vehicle 400 to disable any autonomous functions in response to a determination that the one or more sensors 404 need to be recalibrated. The autonomous functions may be disabled to ensure passenger safety of the vehicle 400. The autonomous functions may be enabled after calibration of the one or more sensors 404 and a determination that the one or more sensors satisfy an acceptable alignment threshold. For example, the acceptable alignment threshold may indicate a tolerance range of the alignment that the vehicle 400 may consider safe to use for autonomous functionality.

Figure 5:
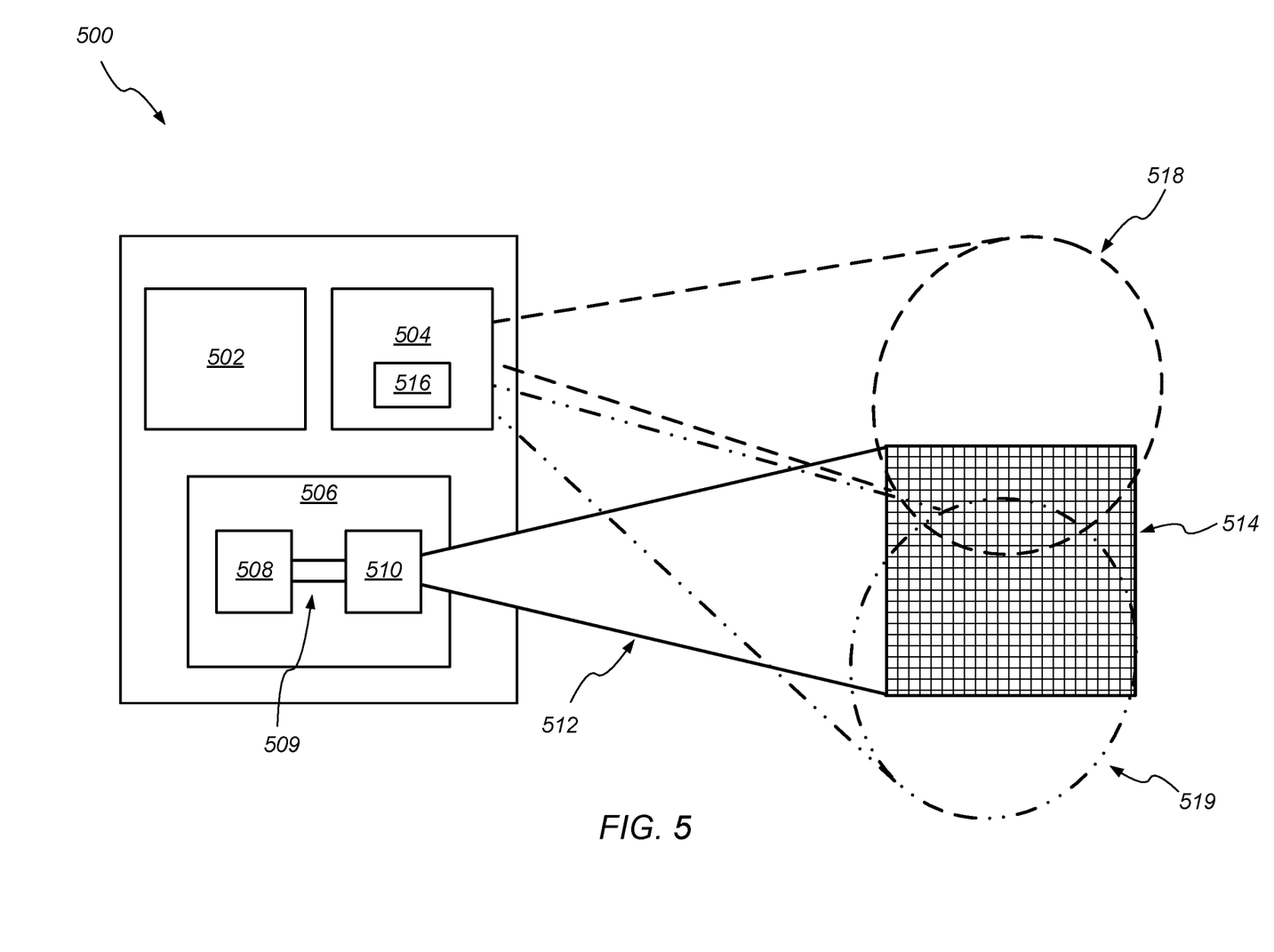
FIG. 5 illustrates a block diagram of a vehicle configured to calibrate a plurality of sensors based on a diffractive pattern projected at a target location, according to some embodiments.

FIG. 5 illustrates a vehicle 500 including a calibration system 502, a plurality of sensors 504 and a projector 506, according to some embodiments. The calibration system 502 may be configured to calibrate the plurality of sensors 504 based on a diffractive pattern 514 being projected at a target location by the projector 506.

In some embodiments, the plurality of sensors 504 may include stereo cameras (e.g., two cameras oriented side-by-side) configured to capture sensor data 516 corresponding to multiple fields of view 518 and 519 directed toward the target location. The fields of view 518 and 519 may be configured to overlap. Using the fields of view 518 and 519, the plurality of sensors 504 may generate the sensor data 516 with depth information associated with the target location. For example, the one or more sensors 404 may be configured to compare the field of view 518 with the field of view 519 to determine distances to objects that may be present at the target location.

In other embodiments, the plurality of sensors 504 may include a plurality of lidar sensors. The plurality of lidar sensors may be positioned at sides of the vehicle 500. For example, the plurality of lidar sensors may be coupled to headlights of the vehicle 500. The plurality of lidar sensors may be configured to capture sensor data 516 corresponding to multiple fields of view 518 and 519. The plurality of lidar sensors may be configured to have the field of view 518 at a first side location with respect to the vehicle 500 and the field of view 519 at a second side location with respect to the vehicle 500. The fields of view 518 and 519 may be configured to not overlap. For example, the plurality of lidar sensors may be positioned at headlights of the vehicle 500 and angled at an offset from a front-facing direction relative to the vehicle 500 such that each of the plurality of lidar sensors may each detect a different portion of the pattern 514 in either the field of view 518 or the field of view 519. The plurality of lidar sensors may be configured to act as peripheral sensors while a front lidar sensor and/or front-facing cameras may act as primary sensors.

The projector 506 may include a light source 508 and a diffractive optical element 510. The light source 508 may be configured to project a light 509 to the diffractive optical element 510. In some embodiments, the light source 508 may be a laser. In other embodiments, the light source 508 may include a plurality of light emitting diodes (LEDs), a halogen light bulb, a xenon light bulb, any combination thereof, or any other light emitting apparatus. The light source 508 may be coupled to the headlights of the vehicle 500. The light 509 may have a wavelength in the spectrum range of visible light. For example, the light 509 may include a near-infrared light (e.g., a spectral range of 700-1000 nm). In some embodiments, the pattern may be formed from a more visible light (e.g., a spectral range of 400 nm-700 nm). In some embodiments, the projector 506 may be configured to project the pattern 514 continuously while the vehicle 500 is in motion. For example, the light source 508 may include a continuous wave light source configured to project the light 509 continuously over a period of time. During continuous motion, the pattern 514 may be normalized such that instantaneous motion (e.g., bumps in the road) may not affect detection of the pattern 514 over a period of time.

The diffractive optical element 510 may be configured to diffract or cause interference to the light 509 to generate a diffracted light 512. The diffractive optical element 510 may be configured to generate a diffractive pattern by having one or more occlusions or obstacles that prevent the light 509 from passing through particular portions of the diffractive optical element 510. The diffracted light 512 may be projected to the target location to show a pattern 414 at the target location. In some embodiments, the pattern 514 may be a grid or mesh with defined spacing. In other embodiments, the pattern 514 may have a known random element such that the pattern 514 is detectable by the one or more sensors 504 and decipherable by the calibration system 502. In additional embodiments, the pattern 514 may comprise a plurality of light points. For example, the pattern 514 may comprise a dot matrix of light points where the dot matrix has discrete light points rather than continuous lines of light. In another example, the pattern 514 may comprise a scatterplot of light points.

The calibration system 502 may be configured to determine a current alignment of the one or more sensors based on the sensor data 516 and a relative position of the pattern 514. The calibration system 502 may have configuration data indicating an expected configuration of the one or more sensors 504. The expected configuration of the one more sensors 504 may indicate an initial configuration or alignment of the one or more sensors 504 that is set during construction of the vehicle 500. For example, a manufacturer may set the one or more sensors 504 at a particular angle to capture a particular view. The particular angle may be stored as the expected configuration as a basis for future calculations by the vehicle 500 and the calibration system 502.

In some embodiments, the vehicle 500 may be an autonomous vehicle. The vehicle 500 may require that the sensor data 516 be as accurate as possible in order to determine a best possible course of action during autonomous driving of the vehicle 500. The sensor data 516 is considered accurate when the one or more sensors 504 capture sensor data that the vehicle 500 expects the one or more sensors 504 to capture, such as when the one or more sensors 504 are aligned in an expected configuration. The calibration system 502 may be configured to determine an alignment the one or more sensors 504 based on a relative position of the pattern 514 in the field of view 518. In some embodiments, the alignment may be determined by comparing the relative position of the pattern 514 against an expected relative position of the pattern 514. The expected relative position may be indicated by the expected configuration. In some embodiments, the expected configuration may indicate that the expected relative position of the pattern 514 is at a right portion in the field of view 518 and at a left portion in the field of view 519. In some embodiments, the fields of view 518 and 519 may overlap such that a substantial portion of the pattern 514 has an expected relative position that would be included in the fields of view 518 and 519. For example, the plurality of sensors 514 may include a plurality of cameras configured to capture the target area with an offset relative to each other camera of the plurality of cameras. The plurality of cameras with offsets may have combined views to determine depth of the target location or any objects contained therein.

In other embodiments, the fields of view 518 and 519 may be directed in substantially different directions such that distinct portions of the pattern 514 may be included in the field of view 518 and other portions of the pattern 514 may be included in the field of view 519. For example, the plurality of sensors 504 may include a plurality of side lidar sensors configured to capture a peripheral view of the target location. The peripheral view may be to a side of the target location to increase a number of views of the target location.

Based on the expected configuration and the fields of view 518 and 519, the calibration system 502 may determine that the plurality of sensors 504 needs to be recalibrated. The plurality of sensors 504 may be configured to adjust the alignment by including one or more mechanical elements that are configured to move one or more components of the one or more sensors 504. For example, the one or more sensors 504 may have an optical lens that may be moved along one or more axes of directional movement. In other embodiments, the one or more sensors 504 may be moved as a whole unit by the one or more mechanical elements.

In some embodiments, the calibration system 502 may instruct the vehicle 500 to disable any autonomous functions in response to a determination that the one or more sensors 504 need to be recalibrated. The autonomous functions may be disabled to ensure passenger safety of the vehicle 500. The autonomous functions may be enabled after calibration of the one or more sensors 504 and a determination that the one or more sensors satisfy an acceptable alignment threshold. For example, the acceptable alignment threshold may indicate a tolerance range of the alignment that the vehicle 500 may consider safe to use for autonomous functionality.

Figure 6:
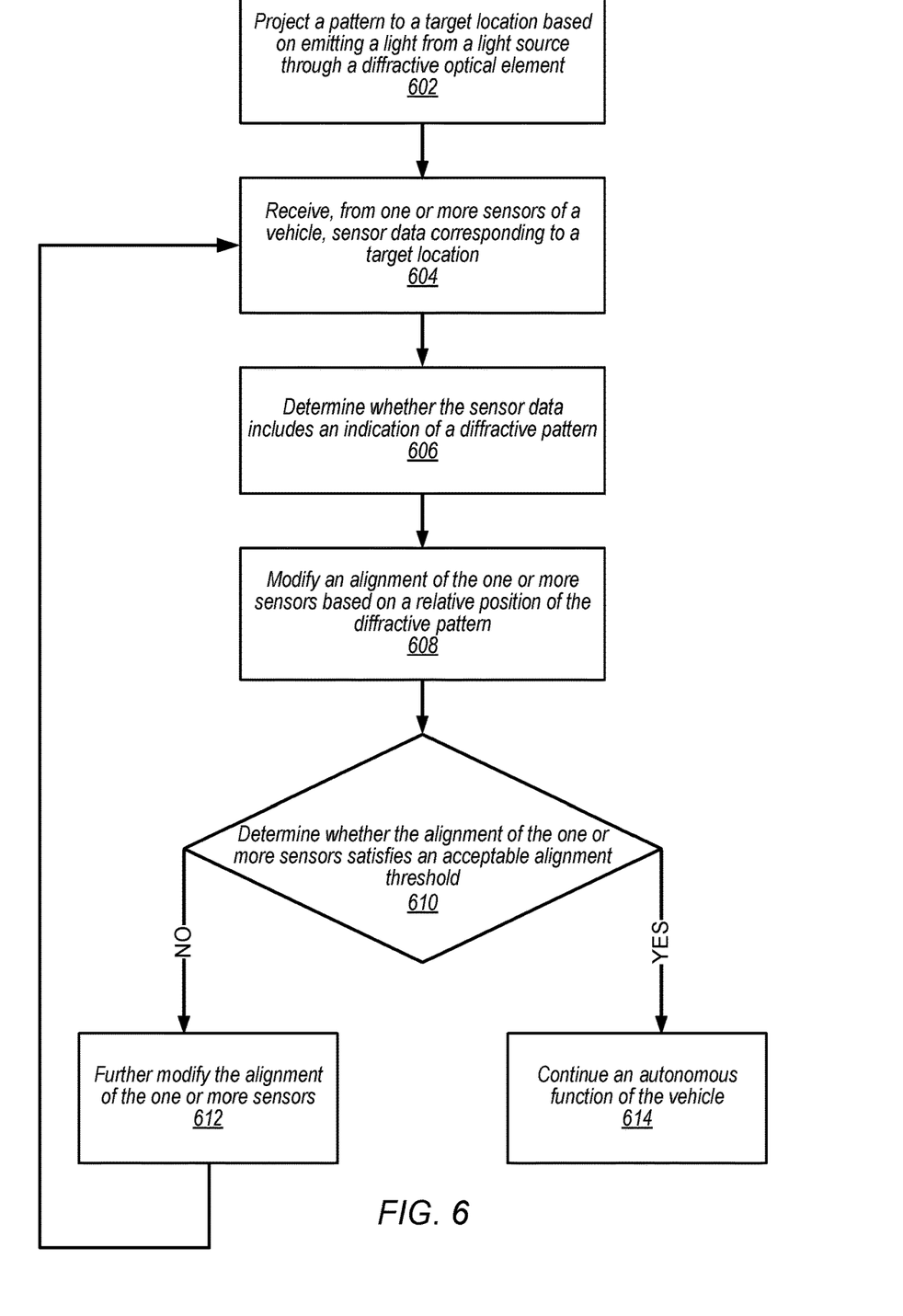
FIG. 6 illustrates a flowchart diagram of a method for real-time sensor alignment and calibration, according to some embodiments.

FIG. 6 illustrates a flowchart diagram of a method to calibrate and align sensors of a vehicle. The vehicle may correspond to the vehicle 100 of FIG. 1, the vehicle 400 of FIG. 4 or the vehicle 500 of FIG. 5. The method may be implemented by any of the embodiments of control systems, control units, calibration systems, etc., disclosed herein. A calibration system can be implemented by one or more computer systems. The calibration system may correspond to the calibration system 102 of FIG. 1, the calibration system 402 of FIG. 4 or the calibration system 502 of FIG. 5.

At 602, the vehicle may cause a projector to project a pattern to a target location. The projector may correspond to the projector 106 of FIG. 1, the projector 230 of FIG. 2, the projector 300 of FIG. 3, the projector 406 of FIG. 4 or the projector 506 of FIG. 5. The projector may include a light source and a diffractive optical element. The light source may be configured to emit a light through the diffractive optical element to create a pattern. The projector may cause the pattern to be projected to the target location from the diffractive optical element.

At 604, the calibration system may receive, from one or more sensors of the vehicle, sensor data corresponding to a target location. The one or more sensors may correspond to the one or more sensors 104 of FIG. 1. The one or more sensors may include a set of cameras or a lidar sensor directed to the target location and configured to capture sensor data corresponding to the target location. For example, the set of cameras may be aimed at the target location and record or capture video data associated with the target location. The sensor data may include the video data. As another example, the lidar sensor may be generally aimed at the target location and be configured to detect light at the target location.

At 606, the calibration system may determine whether the sensor data includes an indication of a diffractive pattern.

The diffractive pattern may be generated and projected by a projector. The projector may correspond to the projector 106 of FIG. 1. For example, the projector may include a light source and a diffractive optical element configured to generate the diffractive pattern. In some embodiments, the light source may be configured to generate light in a spectrum of visible light, such as near-infrared light. The near-infrared light may be detectable by the one or more sensors, as described herein. The light source may also be configured to generate light that is more visible to humans.

At 608, the calibration system may modify an alignment of the one or more sensors based on a relative position of the diffractive pattern. The sensor data may indicate that the diffractive pattern is located in a particular configuration at the target location. Based on the particular configuration, the calibration system may determine a current alignment of the one or more sensors. For example, the sensor data may indicate that the diffractive pattern is offset from an expected configuration of the diffractive pattern at the target location (e.g., too far to the left or right). Based on the sensor data, the calibration system may determine a correction to the alignment such that applying the correction to the alignment may realign the one or more sensors to align the diffractive pattern to the expected configuration. In some embodiments, the diffractive pattern may have an expected configuration of being centered relative to the one or more sensors (e.g., centered from a viewpoint of the one or more sensors). In other embodiments, the expected configuration may be known to be offset in a particular direction by a particular distance.

At 610, the calibration system may determine whether the alignment of the one or more sensors satisfies an acceptable alignment threshold. In some embodiments, the acceptable alignment threshold may be within a tolerance range of the expected configuration. For example, the alignment threshold may indicate a range of relative positions of the one or more sensors where safety is not compromised or otherwise significantly affected. The relative position of the one or more sensors may affect a range of vision of the one or more sensors. For example, the one or more sensors may be directed in a particular direction (e.g., toward the front of the vehicle), but a digression of the alignment of the one or more sensors may cause the one or more sensors to be offset and directed more towards the left or right.

At 612, in response to a determination that the alignment of the one or more sensors does not satisfy the acceptable alignment threshold, the calibration system may cause the vehicle to further modify the alignment of the one or more sensors. In some embodiments, the method 600 may return to step 604 to initiate realignment of the one or more sensors with additional sensor data.

In some embodiments, the vehicle may have an autonomous function that may cause the vehicle to operate without direct inputs from a driver. At 614, in response to a determination that the alignment of the one or more sensors does satisfy the acceptable alignment threshold, the vehicle continue the autonomous function. The determination that the alignment satisfies the acceptable alignment threshold may indicate that the one or more sensors are within a safe tolerance range of relative positioning. The vehicle may be confident in the sensor data from the one or more sensors when the acceptable alignment threshold is satisfied.

Figure 7:
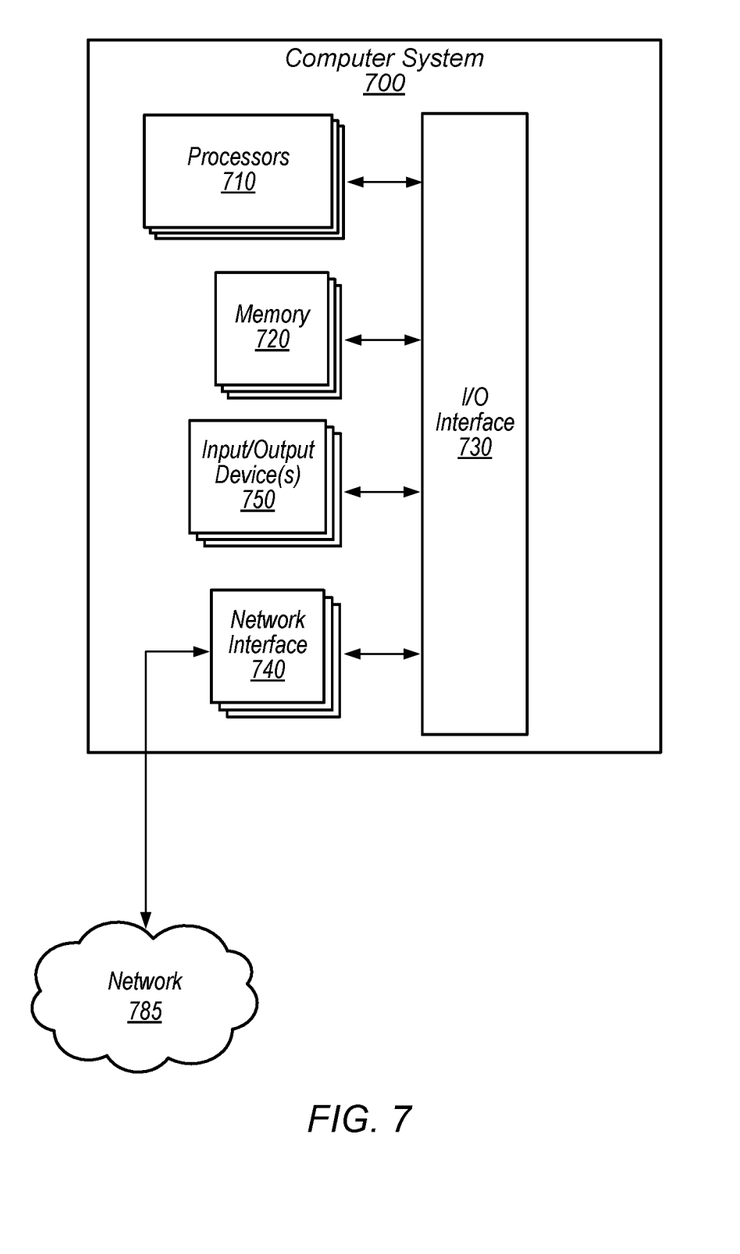
FIG. 7 illustrates an example computer system configured to implement one or more portions of a sensor calibration system, according to some embodiments.

FIG. 7 illustrates an example computer system 700 that may be configured to include or execute any or all of the embodiments described above. In different embodiments, computer system 700 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of an audio communication system, talker feedback system, some combination thereof, etc., as described herein, may be executed in one or more computer systems 700, which may interact with various other devices. Note that any component, action, or functionality described above with respect to FIGS. 1 through 6 may be implemented on one or more computers configured as computer system 700 of FIG. 7, according to various embodiments. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices, which can include one or more user interface (also referred to as "input interface") devices. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions, data, etc. accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 720 may be configured to implement some or all of an ANS, incorporating any of the functionality described above. Additionally, existing control data of memory 720 may include any of the information or data structures described above. In some embodiments, program instructions and/or data may be received, sent or stored upon different types of computer-accessible media or on similar media separate from system memory 720 or computer system 700. While computer system 700 is described as implementing the functionality of functional blocks of previous FIGS., any of the functionality described herein may be implemented via such a computer system.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network 785 (e.g., carrier or agent devices) or between nodes of computer system 700. Network 785 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 700. Multiple input/output devices may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Memory 720 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A vehicle, comprising:
  a projector configured to project a pattern on a target location during movement of the vehicle; and
  one or more sensors configured to capture sensor data from the target location over a period of time; and
  a calibration system configured to:
    detect an averaged view of the pattern at the target location according to the sensor data;

determine whether a particular sensor of the one or more sensors is out of alignment based on a relative position of the pattern as detected by the one or more sensors; and based on a determination that the particular sensor is out of alignment, adjust an alignment of the particular sensor based on the sensor data and the pattern.

2. The vehicle of claim 1, wherein the calibration system further comprises one or more actuators configured to adjust the alignment of the particular sensor.

3. The vehicle of claim 1, wherein the one or more sensors comprises a plurality of cameras, and wherein the plurality of cameras is configured to capture camera data for the target location.

4. The vehicle of claim 3, further comprising a rear view mirror coupled to the plurality of cameras, wherein the plurality of cameras is arranged in a stereoscopic orientation.

5. The vehicle of claim 1, wherein the one or more sensors comprises a front light detection and ranging (lidar) sensor configured to capture front lidar data for the target location.

6. The vehicle of claim 1, wherein the one or more sensors comprises a plurality of side lidar sensors configured to capture side lidar data for a plurality of side locations, and wherein each of the side locations at least partially overlap with the target location.

7. The vehicle of claim 6, further comprising:
a first headlight coupled to a first side lidar sensor of the plurality of side lidar sensors; and
a second headlight coupled to a second side lidar sensor of the plurality of side lidar sensors.

8. The vehicle of claim 1, wherein the projector comprises a diffractive optical element, wherein, to project the pattern, the projector is configured to project a light to the diffractive optical element, and wherein the pattern comprises a grid pattern.

9. The vehicle of claim 8, wherein the diffractive optical element projector is affixed to the vehicle, and wherein a position of the diffractive optical element projector is a reference point for the one or more sensors.

10. A method, comprising:
projecting, from a vehicle, a pattern to a target location during movement of the vehicle;
receiving, from one or more sensors of the vehicle, sensor data indicative of a target location;
determining a relative position of the pattern at the target location indicated in an averaged view of the target location according to the sensor data;
determining whether the one or more sensors are out of alignment based on the relative position of the pattern; and
modifying an alignment of the one or more sensors based on the relative position of the pattern.

11. The method of claim 10, further comprising:
receiving, from one or more additional sensors of the vehicle, additional sensor data indicative of a second target location, wherein the pattern is at least partially projected to the second target location;
determining a second relative position of the pattern at the second target location indicated in the additional sensor data;
determining whether the one or more additional sensors are out of alignment based on the second relative position of the pattern; and
modifying an alignment of the one or more additional sensors based on the second relative position of the pattern.

12. The method of claim 10, wherein projecting the pattern comprises pulsing a light source of a diffractive optical element projector at a particular frequency equivalent to a frame rate of the one or more sensors.

13. The method of claim 10, wherein determining whether the one or more sensors are out of alignment comprises:
comparing the relative position of the pattern to an expected position of the pattern, wherein the expected position of the pattern is indicated in an expected configuration of the one or more sensors.

14. The method of claim 10, further comprising:
enabling an autonomous function of the vehicle;
determining whether the alignment of the one or more sensors satisfies an acceptable alignment threshold; and
in response to a determination that the alignment does not satisfy the acceptable alignment threshold:
receive, from the one or more sensors, additional sensor data indicative of the target location;
determining a second relative position of the diffractive pattern indicated in the sensor data; and
modifying the alignment of the one or more sensors based on the second relative position of the diffractive pattern.

15. The method of claim 14, further comprising:
after modifying the alignment, determining whether the modified alignment satisfies the acceptable alignment threshold; and
in response to a determination that the modified alignment satisfies the acceptable alignment threshold, continuing the autonomous function of the vehicle.

16. A non-transitory computer-readable storage medium storing instructions that, when executed by one or more processors, cause the one or more processors to perform operations including:
receiving, from one or more sensors of a vehicle, alignment data identifying an alignment of the one or more sensors;
receiving, from the one or more sensors during movement of the vehicle, sensor data indicative of a reference point that is outside of the vehicle;
determining, based on the alignment data and an averaged view of the reference point according to the sensor data, whether the one or more sensors are misaligned;
in response to a determination that the one or more sensors are misaligned, instructing a calibration system to adjust alignment of the one or more sensors.

17. The non-transitory computer-readable storage medium of claim 16, wherein the operations further include sending an instruction to a projector to generate the pattern comprising a diffractive pattern, wherein the projector is configured to project the diffractive pattern to a target location.

18. The non-transitory computer-readable storage medium of claim 17, wherein the reference point includes the diffractive pattern.

19. The non-transitory computer-readable storage medium of claim 16, wherein the operations further include:
calculating an alignment adjustment metric based on a relative position of the reference point, wherein the one or more sensors are adjusted based on the alignment adjustment metric.

20. The non-transitory computer-readable storage medium of claim 16, wherein determining whether the one or more sensors are misaligned comprises comparing the alignment data to an alignment reference value.

* * * * *